Nov. 7, 1950
R. W. LESHER
2,529,090
EGG WASHER
Filed Nov. 20, 1946
2 Sheets-Sheet 1
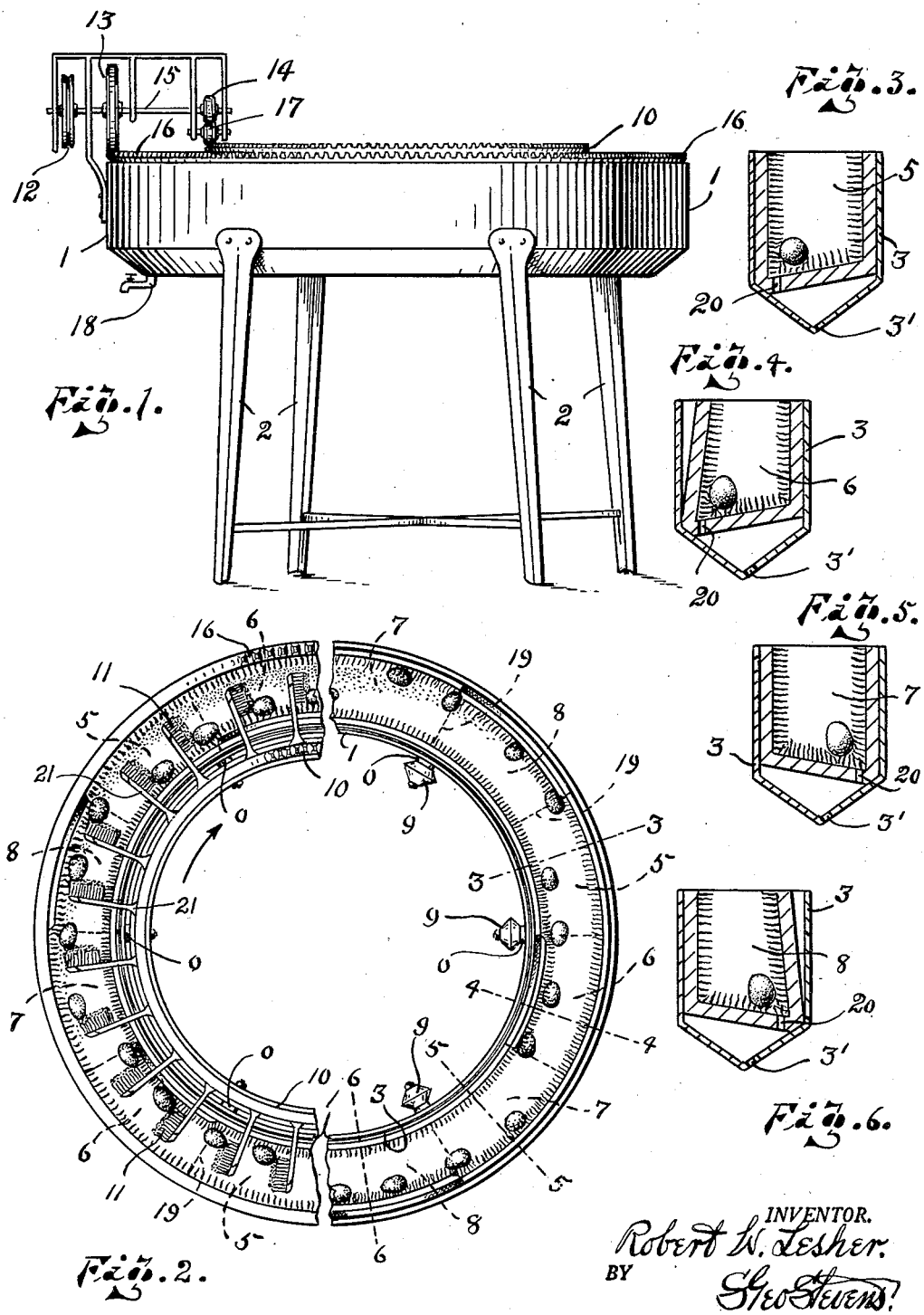

Nov. 7, 1950  R. W. LESHER  2,529,090
EGG WASHER
Filed Nov. 20, 1946  2 Sheets-Sheet 2
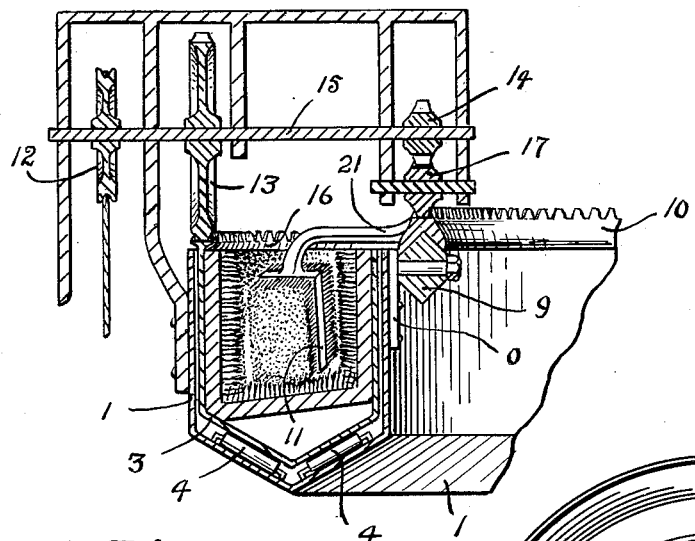
Fig. 7.
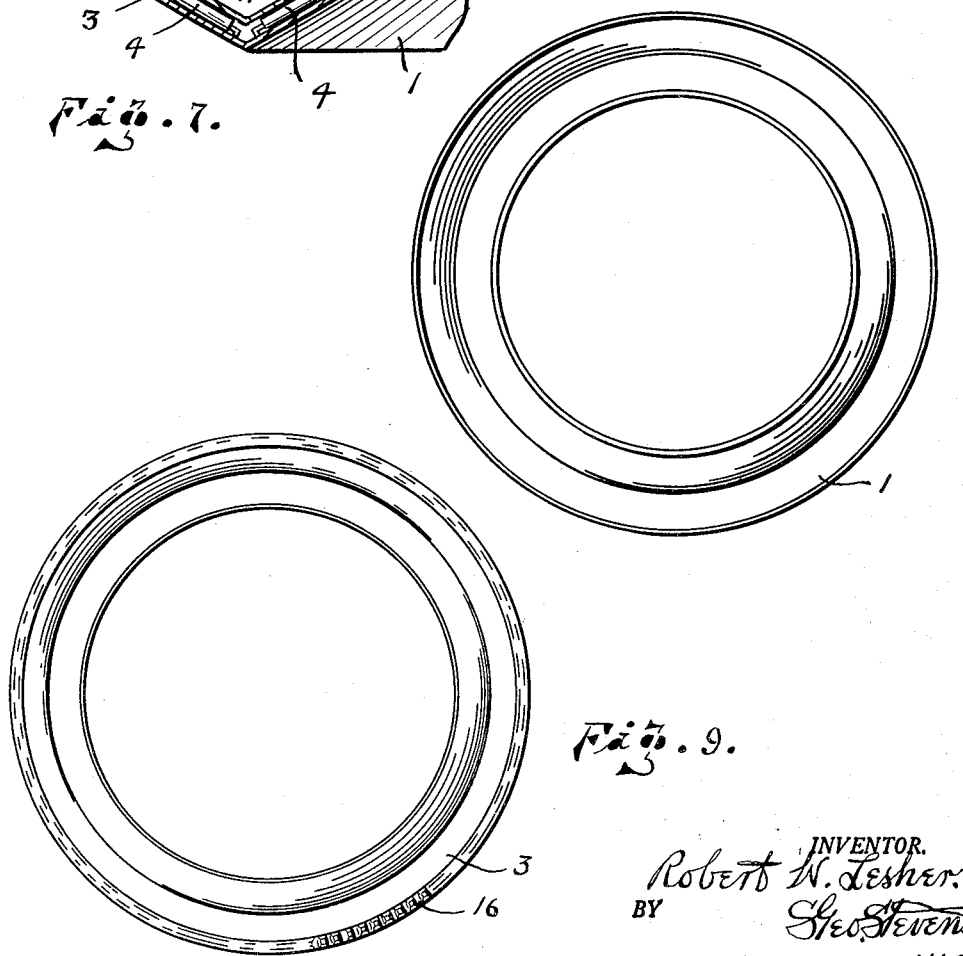
Fig. 8.
Fig. 9.
INVENTOR.
Robert W. Lesher.
BY Geo. Stevens
atty.

Patented Nov. 7, 1950

2,529,090

UNITED STATES PATENT OFFICE 2,529,090

EGG WASHER

Robert W. Lesher, Duluth, Minn.

Application November 20, 1946, Serial No. 711,155

8 Claims. (Cl. 15—3.15)

This invention relates to an egg washing machine and has as its principal object the provision of a simple mechanical means for washing and brushing a number of eggs simultaneously with a maximum of cleaning and a minimum of breakage.

Another object is to provide such a machine which is easy and especially convenient to operate.

Another object is to provide positive means for turning and rolling the eggs so that they will be thoroughly brushed and washed simultaneously as they are being rolled around through communicating bristle lined compartments of varying shapes.

Other objects and advantages will appear as the description of the invention progresses.

Referring now to the accompanying drawings forming part of this application:

Fig. 1 is a side elevational view of the completely assembled egg washer.

Fig. 2 is a broken plan view of the receptacles, one half of which illustrates the relative position of the rotative brushes within the receptacles and the other half, more particularly, the segmental arrangement of washing compartments with eggs therein.

Fig. 3 is a cross sectional view on the line 3—3 Fig. 2.

Fig. 4 is a cross sectional view on the line 4—4 Fig. 2.

Fig. 5 is a cross sectional view on the line 5—5 Fig. 2.

Fig. 6 is a cross sectional view on the line 6—6 Fig. 2.

Fig. 7 is an enlarged sectional view through the driving gear assembly and the receptacles just rearwardly of one of the rotative brushes and through one of the rack carrying rollers, the brush shown being a modified form to that shown in Fig. 2.

Fig. 8 is a slightly reduced top plan view of the outermost stationary receptacle.

Fig. 9 is a slightly reduced top plan view of the innermost rotative pervious receptacle independent of the brush lining.

In the drawing, the reference numeral 1 represents the circular, stationary, trough-like base having a V-shaped bottom which is supported upon suitable legs 2—2 at the most desirable height for convenient operation.

Rotatably installed within the base 1 is the brush lined pervious pan or receptacle 3, there being suitable rollers 4—4 spaced along the inner V-shaped bottom of the base 1 to permit of ready rotation of the pan 3 therewithin. The pan 3 has installed therein a repeated series of communicating, brush lined, pervious compartments 5, 6, 7 and 8 having different arrangements of inner side and bottom walls as shown in Figs. 3, 4, 5 and 6 to augment and insure the turning of an egg as it is being rolled through said compartments, the line of demarcation between the compartments being indicated in dotted lines at 19 in Fig. 2. The bottom of said compartments is perforated as indicated at 20. The outer bottom of the pan 3 is V-shaped to ride smoothly on the rollers 4—4 as it is being rotated during the operation of the machine, and perforated as at 3' to permit of free flow of liquid therethrough (see Figs. 3, 4, 5 and 6).

Concentrically mounted upon suitable V-shaped rollers 9 in the brackets O fixed to the inner wall of the base 1 is the rotatable rack 10 having a V-shaped groove for registration with said rollers and carrying any desired number of soft bristled, egg pushing brushes 11 by means of the substantially radially extending arms 21 which hold the brushes outwardly from the rack and depending within the brush lined pan 3. These brushes are mounted on an incline so that their lowermost portions are forward towards the direction of rotation and just above the nearest portions of the bristled bottom wall. This feature insures a lifting motion being applied to the fragile eggs as they are being pushed and cleaned through the compartments.

The preferred method of rotating the parts of this machine is by suitable gear arrangement so that the inner pan 3 rotates twice in one direction while the brush carrying rack 10 rotates once in the opposite direction. The drive pulley 12 which may be motor or manually powered, operates the gears 13 and 14 on the same shaft 15, the large gear 13 rotating the pan 3 by means of the toothed outer ring 16, and the smaller gear 14 operates a like gear 17 which rotates the rack 10 slower and in the opposite direction to the pan 3.

In the operation of the machine, water or other suitable liquid may be used to a predetermined desired level or sprayed therein as the pan 3 and the brush carrying rack 10 are rotated. Then an egg is placed between each of the brushes 11 as they pass the operator when they are pushed lightly along by the brushes 11 making a complete circuit through all the communicating chambers 5, 6, 7 and 8 where they are being turned by the peculiar arrangement of side and bottom walls of the pan 3 which causes them to be rolled from one side of the pan to the other as shown while the bristles of both the brushes 11 and the walls and bottom of the compartments are constantly brushing off any foreign matter on the exterior of the eggs. As each egg comes back to the starting point it is removed by the operator and an egg to be cleaned is put in its place, thereby allowing the machine to operate at full capacity at all times and giving the eggs a maximum of cleaning action.

The possibility of breakage is greatly reduced in a machine of this type as the eggs are riding constantly on soft bristles and are being lifted along through the chambers by the brushes 11 being inclined in the manner shown.

At the radial meeting edges of the different shaped compartments 5, 6, 7 and 8 as shown in dotted lines at 19 in Fig. 2 where a rather abrupt change in the elevation of the bristled bottom occurs, the bristles may be trimmed to ease the shock somewhat and to assist in an egg changing its position in entering a different shaped compartment.

If desired, the back of the brushes 11 may be bristled as shown in Fig. 7 of the drawing for further cleansing and agitating activity during operation of the machine.

A drain is indicated at 18 for the otherwise impervious outer pan 1, but as is obvious, either individual batches of washing fluid or a constantly changing supply thereof may be used in operating the machine.

What I claim is:

1. In an egg washing machine: a stationary annular supporting V-bottomed water holding base; anti-friction bearings within and adjacent the bottom of said base; a similarly shaped open-topped egg-receiving pervious rotatable pan within said base and resting upon said bearings, the upper portion of said pan having a continuous but varying shaped brush-lined interior for causing moving eggs therein to travel tortuously; anti-friction bearings carried adjacent the upper edge of the inner wall of said base; an annular racked brush-carrying rotatable ring resting upon said last mentioned bearings and having radially disposed equally spaced arms extending therefrom, each carrying a bristled brush depending within said brush lined interior for activating an egg therewithin; and power means for simultaneously rotating said ring and said egg-receiving pan in opposite directions.

2. In a washing machine of the type described; an annular relatively narrow V-bottomed supporting base; anti-friction bearings adjacent the bottom of and within said base; a similarly shaped brush-lined object carrying pan within said base and rotatable on said bearings; an annular ring rotatably carried on said base concentric with and above said base and pan; a plurality of object propelling brushes carried by said ring, radially extending therefrom and depending within said brush-lined pan; and power means for simultaneously revolving said last mentioned brush-lined pan and ring in opposite directions.

3. An egg washing machine as set forth in claim 2 further characterized by said brush-lined pan having irregularly shaped inner side walls and bottom forming a series of irregular communicating chambers, so constructed and arranged as to augment tortuousness of the path traveled by said objects while being washed.

4. In a cleaning device of the type described; a circular trough-like stationary base having a V-bottom, a pervious brush-lined similarly shaped receptacle rotatably carried within said base, a rotatable rack concentrically mounted upon the upper inner side wall of said base portion, brushes extending radially from said rack and within said receptacle, and means to rotate said rack and receptacle in opposite directions simultaneously.

5. A device as set forth in claim 4, further characterized by said brushes being inclined forwardly towards the direction of rotation of said rack.

6. An egg washing machine comprising: an annular relatively narrow V-bottomed supporting base; roller bearings adjacent the bottom of and within said base; a similarly shaped brush-lined, egg carrying pan within said base and rotatable on said bearings; an annular ring rotatably carried on said base concentric with and above said base and pan; a plurality of egg pushing and cleaning brushes carried by said ring, radially extending therefrom and depending within said brush-lined pan; and power means for simultaneously revolving said brush-lined pan and said ring in opposite directions, said brushes being inclined toward the direction of rotation of said ring.

7. An egg washing machine comprising an annular supporting base, an annular pan rotatably carried by said base, the inner walls of said pan being lined with bristles, said pan being divided into a plurality of communicating compartments having irregularly arranged side and bottom walls, an annular ring rotatably mounted concentrically with said base and pan, a plurality of brushes carried by said ring and extending into said pan, and means to rotate said pan and ring in opposite directions simultaneously.

8. The structure as set forth in claim 7 and said brushes being inclined toward the direction of rotation of said ring.

ROBERT W. LESHER.

REFERENCES CITED

The following references are of record in the file of this patent:

UNITED STATES PATENTS

| Number | Name | Date |
|--------|------|------|
| 550,363 | Deane | Nov. 26, 1895 |
| 600,394 | Wright | Mar. 8, 1898 |
| 734,284 | Stebler | July 21, 1903 |
| 846,162 | Strain | Mar. 5, 1907 |